US012278581B2

(12) United States Patent
Farah et al.

(10) Patent No.: US 12,278,581 B2
(45) Date of Patent: Apr. 15, 2025

(54) DELAY REDUCTION FOR PULSED WOUND FIELD SYNCHRONOUS MACHINES

(71) Applicant: Tula eTechnology, Inc., San Jose, CA (US)

(72) Inventors: Philippe Farah, Maisons-Laffitte (FR); Paul Carvell, San Jose, CA (US)

(73) Assignee: Tula eTechnology, Inc., San Jose, CA (US)

( * ) Notice: Subject to any disclaimer, the term of this patent is extended or adjusted under 35 U.S.C. 154(b) by 139 days.

(21) Appl. No.: 18/184,569

(22) Filed: Mar. 15, 2023

(65) Prior Publication Data

US 2023/0308040 A1 Sep. 28, 2023

Related U.S. Application Data

(60) Provisional application No. 63/322,376, filed on Mar. 22, 2022.

(51) Int. Cl.
*H02K 3/28* (2006.01)
*H02P 23/30* (2016.01)
*H02P 25/022* (2016.01)
*H02P 27/08* (2006.01)

(52) U.S. Cl.
CPC .............. *H02P 27/08* (2013.01); *H02P 23/30* (2016.02); *H02P 25/022* (2013.01)

(58) Field of Classification Search
CPC ........ H02P 27/08; H02P 23/30; H02P 25/022; H02P 25/03
See application file for complete search history.

(56) References Cited

U.S. PATENT DOCUMENTS

| | | | |
|---|---|---|---|
| 4,441,043 A | 4/1984 | Decesare | |
| 4,989,146 A | 1/1991 | Imajo | |
| 5,099,410 A | 3/1992 | Divan | |
| 5,151,637 A | 9/1992 | Takada et al. | |
| 5,325,028 A | 6/1994 | Davis | |
| 5,483,141 A | 1/1996 | Uesugi | |
| 5,640,073 A | 6/1997 | Ikeda et al. | |
| 5,701,062 A | 12/1997 | Barrett | |
| 5,731,669 A | 3/1998 | Shimizu et al. | |
| 6,121,740 A | 9/2000 | Gale et al. | |
| 6,291,960 B1 | 9/2001 | Crombez | |

(Continued)

FOREIGN PATENT DOCUMENTS

| | | |
|---|---|---|
| CN | 1829070 A | 9/2006 |
| CN | 102381265 A | 3/2012 |

(Continued)

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.

(Continued)

*Primary Examiner* — Muhammad S Islam
(74) *Attorney, Agent, or Firm* — Beyer Law Group LLP

(57) ABSTRACT

An electric machine is provided. A power converter is coupled between a power supply and a wound field synchronous machine. The power converter is arranged to provide a pulsed operation by providing a pulsed DC current to field windings of the wound field synchronous machine.

20 Claims, 12 Drawing Sheets

(56) References Cited

U.S. PATENT DOCUMENTS

| | | |
|---|---|---|
| 6,308,123 B1 | 10/2001 | Ikegaya et al. |
| 6,370,049 B1 | 4/2002 | Heikkila |
| 6,424,799 B1 | 7/2002 | Gilmore |
| 6,483,218 B1 | 11/2002 | Petrinko |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B2 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 8,020,651 B2 | 9/2011 | Zillmer et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 8,841,876 B2 | 9/2014 | Leaver et al. |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,340,821 B2 | 7/2019 | Magee et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,763,772 B1 | 9/2020 | Fatemi et al. |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,167,648 B1 | 11/2021 | Carvell et al. |
| 11,228,272 B2 | 1/2022 | Tripathi |
| 11,345,241 B1 | 5/2022 | Cai |
| 11,427,177 B2 | 8/2022 | Serrano et al. |
| 11,557,996 B1 | 1/2023 | Arvanitis |
| 11,623,529 B2 | 4/2023 | Carvell et al. |
| 11,626,827 B2 | 4/2023 | Tripathi |
| 11,628,730 B2 | 4/2023 | Srinivasan |
| 11,637,513 B2 | 4/2023 | Phillips et al. |
| 11,673,476 B2 | 6/2023 | Cai |
| 11,695,361 B2 | 7/2023 | Carvell et al. |
| 12,003,202 B2 | 6/2024 | Tripathi |
| 2001/0039926 A1 | 11/2001 | Kobayashi et al. |
| 2002/0043954 A1 | 4/2002 | Hallidy et al. |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2006/0290316 A1* | 12/2006 | Seguchi ............... H02P 25/03 |
| | | 318/720 |
| 2007/0216345 A1 | 9/2007 | Kanamori |
| 2007/0287594 A1 | 12/2007 | DeGeorge et al. |
| 2008/0079375 A1* | 4/2008 | Seguchi ............... H02P 27/08 |
| | | 318/722 |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0058592 A1 | 3/2009 | Leghissa et al. |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0066299 A1 | 3/2010 | Izumi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217916 A1 | 8/2012 | Wu et al. |
| 2012/0217921 A1 | 8/2012 | Wu et al. |
| 2013/0002173 A1 | 1/2013 | Baglino et al. |
| 2013/0062138 A1 | 3/2013 | Naitou et al. |
| 2013/0119814 A1 | 5/2013 | Burch et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2013/0314021 A1 | 11/2013 | Yamada et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0061607 A1* | 3/2015 | Pan ....................... H02P 25/22 |
| | | 322/27 |
| 2015/0236628 A1 | 8/2015 | Wang et al. |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0336891 A1* | 11/2016 | Seguchi ............... H02P 25/03 |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0267919 A1 | 8/2019 | Suzuki et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0203263 A1 | 7/2021 | Serrano et al. |

(56) References Cited

U.S. PATENT DOCUMENTS

| | | | |
|---|---|---|---|
| 2021/0344199 A1* | 11/2021 | Flannery | ............ H02J 3/26 |
| 2021/0351733 A1 | 11/2021 | Carvell | |
| 2022/0234451 A1 | 7/2022 | Srinivasan | |
| 2022/0416707 A1 | 12/2022 | Chen | |
| 2023/0114289 A1 | 4/2023 | Islam et al. | |
| 2023/0219426 A1 | 7/2023 | Carvell et al. | |
| 2023/0223885 A1 | 7/2023 | Tripathi | |
| 2023/0283211 A1 | 9/2023 | Carvell | |
| 2024/0022191 A1 | 1/2024 | Phillips et al. | |
| 2024/0136968 A1 | 4/2024 | Mazda | |
| 2024/0291410 A1 | 8/2024 | Carvell et al. | |
| 2024/0291416 A1 | 8/2024 | Tripathi | |
| 2024/0364250 A1 | 10/2024 | Carvell | |
| 2024/0372489 A1 | 11/2024 | Srinivasan | |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| CN | 110212725 | 9/2019 |
| DE | 102014206342 | 10/2015 |
| EP | 2605398 A1 | 6/2013 |
| FR | 2989479 | 10/2013 |
| GB | 2273212 | 8/1994 |
| JP | H05153705 | 6/1993 |
| JP | 10243680 | 9/1998 |
| JP | 2008-079686 A | 4/2008 |
| JP | 2009-065758 A | 3/2009 |
| JP | 2011-67043 | 3/2011 |
| JP | 2012-228134 | 11/2012 |
| JP | 5165660 B2 | 12/2012 |
| JP | 2014-033449 A | 2/2014 |
| JP | 5857472 B2 | 12/2015 |
| JP | 2017-011970 A | 1/2017 |
| JP | 2017-200382 | 11/2017 |
| JP | 2018-033250 A | 3/2018 |
| JP | 2020048254 A | 3/2020 |
| JP | 2022/020123 | 2/2022 |
| KR | 10-2013-0095773 | 8/2013 |
| KR | 10-2017-0021146 A | 2/2017 |
| KR | 10-2017-0032976 A | 3/2017 |
| WO | WO03/36787 A1 | 5/2003 |
| WO | WO2012-010993 A2 | 1/2012 |

OTHER PUBLICATIONS

Spong et al., "Feedback Linearizing Control of Switched Reluctance Motors", IEEE Transactions on Automatic Control, vol. AC-32, No. 5, May 1987, pp. 371-379.

Mirzaeva et al., "The use of Feedback Quantizer PWM for Shaping Inverter Noise Spectrum", Power Electronics and Motion Control Conference (EPE/PEMC), 2012 15$^{th}$ International IEEE, Sep. 4, 2012, pp. DS3c. 10-1, XP032311951, DOI: 10.1109/EPEPEMC.2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.

Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.

Islam, U.S. Appl. No. 18/165,100, filed Feb. 6, 2023.
Phillips, U.S. Appl. No. 18/305,776, filed Apr. 24, 2023.
Phillips, U.S. Appl. No. 18/348,255, filed Jul. 6, 2023.
Carvell et al., U.S. Appl. No. 18/362,602, filed Jul. 31, 2023.
Parsels et al., U.S. Appl. No. 18/452,363, filed Aug. 18, 2023.
Islam et al., U.S. Appl. No. 18/452,050, filed Aug. 18, 2023.
Islam et al., U.S. Appl. No. 18/452,260, filed Aug. 18, 2023.
International Search Report and Written Opinion dated Jun. 29, 2023 from International Application No. PCT/US2023/015279.

* cited by examiner

DELAY REDUCTION FOR PULSED WOUND FIELD SYNCHRONOUS MACHINES

CROSS-REFERENCE TO RELATED APPLICATION

This application claims the benefit of priority of U.S. Application No. 63/322,376, filed Mar. 22, 2022, which is incorporated herein by reference for all purposes.

BACKGROUND

The present application relates generally to pulsed control of electric machines to selectively deliver a desired output in a more energy efficient manner, and more particularly, to pulsed electric wound field synchronous machines.

The term "machine" as used herein is intended to be broadly construed to mean both electric motors and generators. Electric motors and generators are structurally very similar. Both include a stator having a number of poles and a rotor. When a machine is operating as a motor, it converts electrical energy into mechanical energy. When operating as a generator, the machine converts mechanical energy into electrical energy.

SUMMARY

A variety of methods, controllers, and electric machine systems are described that facilitate pulsed control of a multiple electric machine (e.g., electric motors and generators) drive system to improve the energy conversion efficiency of the electric machines when operating conditions warrant. More specifically, an electric machine is provided. A power converter is coupled between a power supply and a wound field synchronous machine. The power converter is arranged to provide a pulsed operation by providing a pulsed DC current to field windings of the wound field synchronous machine.

In another embodiment, a method of operating a wound field synchronous machine with field windings and armature winding is provided. A pulsed operation is provided by providing a pulsed DC current to the field windings.

These and other features of the present disclosure will be described in more detail below in the detailed description of the disclosure and in conjunction with the following figures.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
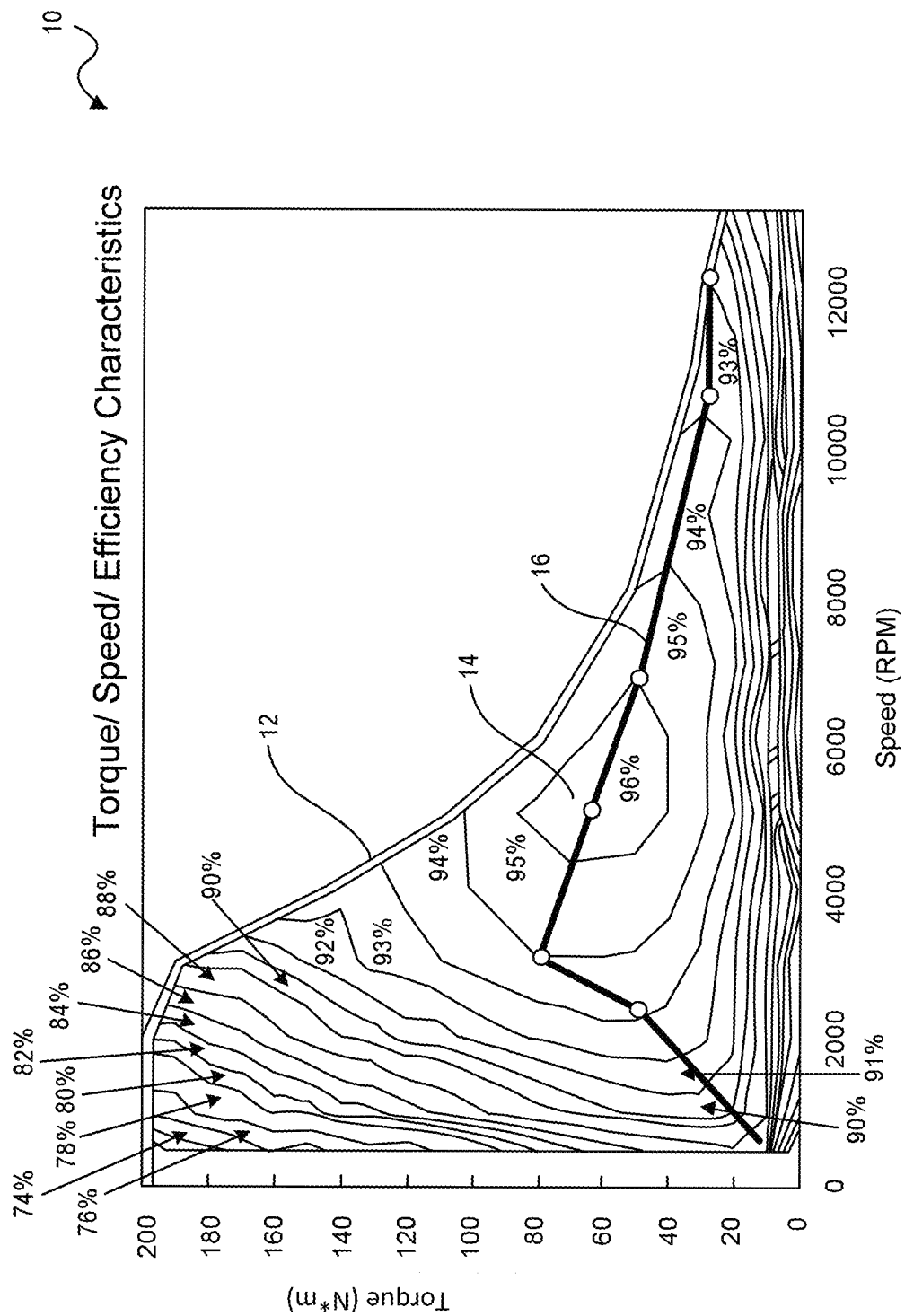
FIG. 1 is a representative Torque/Speed/Efficiency graph illustrating the energy conversion efficiency of a representative electric motor under different operating conditions.

Modern electric machines have relatively high energy conversion efficiencies. The energy conversion efficiency of most electric machines, however, can vary considerably based on their operational load. With many applications, a machine is required to operate under a wide variety of different operating load conditions. As a result, machines typically operate at or near the highest levels of efficiency at certain times, while at other times, they operate at lower efficiency levels.

Battery powered electric vehicles provide a good example of an electric machine operating at a wide range of efficiency levels. During a typical drive cycle, an electrical vehicle will accelerate, cruise, de-accelerate, brake, corner, etc. Within certain rotor speed and/or torque ranges, the electric machine operates at or near its most efficient operating point, i.e., its "sweet spot". Outside these ranges, the operation of the electric machine is less efficient. As driving conditions change, the machine transitions between high and low operating efficiency levels as the rotor speed and/or torque changes. If the electric machine could be made to operate a greater proportion of a drive cycle in high efficiency operating regions, the range of the vehicle for a given battery charge level would be increased. Since the limited range of battery powered electric vehicles is a major commercial impediment to their use, extending the operating range of the vehicle is highly advantageous. A need, therefore, exists to operate electric machines, such as motors and generators, at higher levels of efficiency.

The present application relates generally to pulsed control of electric wound field synchronous machines that would otherwise be operated in a continuous manner. By pulsed control, the machine is intelligently and intermittently pulsed on and off to both (1) meet operational demands while (2) improving overall efficiency. More specifically, under selected operating conditions, an electric machine is intermittently pulse-driven at more efficient energy conversion operating levels to deliver the desired average output more efficiently than would be attained by conventional continuous machine operation. Pulsed operation results in deliberate modulation of the electric machine torque; however, the modulation is managed in such a manner such that levels of noise or vibration are minimized for the intended application.

For the sake of brevity, the pulsed control of electric wound field synchronous machines as provided herein is described in the context of a three-phase electric wound field synchronous motor in a vehicle. This explanation, however, should not be construed as limiting in any regard. On the contrary, the pulse control as described herein can be used for many types of electric wound field synchronous motor machines, meaning both electric motors and generators. In addition, pulsed control of such electric wound field synchronous machines may be used in any application, not just limited to electric vehicles. In particular, pulsed control may be used in systems that require lower acceleration and deceleration rates than vehicle applications, such as electric motors for heating, cooling, and ventilating systems.

Pulsed engine control is described in U.S. patent application Ser. No. 16/353,159 filed on Mar. 14, 2019, and U.S. Provisional Patent Application No. 62/644,912, filed on Mar. 19, 2018; 62/658,739, filed on Apr. 17, 2018; and 62/810,861 filed on Feb. 26, 2019. Each of the foregoing applications is incorporated herein by reference in their entirety.

Wound Field Synchronous Machines

Wound field synchronous machines are motors or generators that are able to convert electricity to mechanical movement or mechanical movement to electricity without permanent magnets. Wound field synchronous machines may be wound field synchronous motors (WFSM) and wound field synchronous generators.

Wound field synchronous machines also referred to as Externally Excited Synchronous Machines (EESM) or Wound Rotor Synchronous Machines (WRSM), include:
  wound field synchronous rotors, where the field coil (also called field windings) is located in the rotor, whereas the armature phase windings are in the stator;
  or flux switching where both the field coil and the armature windings are located in the stator.

In a wound field synchronous machine, the field coil is powered by a DC power source. In most wound filed synchronous machines, the armature windings are powered by an AC power source. In most wound field synchronous machines, the field coil is on the rotor and the armature windings are on the stator. In such wound field synchronous machines, slip rings may be used to provide electrical contacts between the DC power source and the field coils on the rotor. In other embodiments, an airgap may be used to provide electrical contact. A DC motor would place the field coils on the stator and use a commutator connected to the rotor in order to convert DC power to AC power.

Three-Phase Wound Field Synchronous Machine

In a three-phase wound field synchronous machine, the stator may include a three-coil winding that is excited by a three-phase AC input and the field windings are on the rotor that is powered by a DC input. When the three-phase AC input is passed through the three-phase armature windings, a rotating magnetic field (RMF) is generated. The rotational rate of the RMF is known as the synchronous speed ($N_s$) of the electric machine. The interaction of the field winding fields and armature winding fields generates an electromagnetic force (EMF) causing the rotor rotation.

Vehicle Motor Efficiency Mau

Referring to FIG. 1, an exemplary vehicle motor efficiency map 10 under different load and speed conditions is illustrated. The map 10 plots torque (N*m) along the vertical axis as a function of motor speed (RPM) along the horizontal axis. The maximum steady-state output power is given by curve 12. The exemplary vehicle motor efficiency map is shown to help illustrate an increase in efficiency of a wound field synchronous motor (WFSM) that may be provided by an embodiment.

The area under the peak-torque/speed curve 12 is mapped into a plurality of regions, each labeled by an operational efficiency percentage. For the particular motor shown, the following characteristics are evident:

The most efficient or "sweet-spot" region of its operating range is the operating region labeled 14, which is generally in the range of 4,500-6,000 RPM with a torque output in the range of about 40-70 N*m. In region 14, the energy conversion efficiency is on the order of 96%, making it the "sweet spot", where the motor is operating in its most efficient operating range.

As the motor speed increases beyond approximately 6,000+RPM, the efficiency tends to decrease, regardless of the output torque.

As the output torque increases beyond 70 N*m or falls below 40 N*m, the efficiency percentage tends to decrease from its peak, in some situations rather significantly. For example, when the motor is operating at approximately 2,000 RPM and an output torque of 100 N*m, the efficiency is approximately 86%. When torque output falls below about 30 N*m, regardless of the motor speed, the efficiency drops, approaching zero at zero load.

At any particular motor speed, there will be a corresponding most efficient output torque, which is diagrammatically illustrated by a maximum efficiency curve 16.

The map 10 as illustrated was derived from an electric motor used in a 2010 Toyota Prius. Map 10 is for an internal permanent magnet synchronous motor. It should be understood that this map 10 is merely illustrative and should not be construed as limiting in any regard. A similar map can be generated for just about any electric motor, for example, a 3-phase induction motor, regardless of whether used in a vehicle or in some other application.

As can be seen from the map 10, the motor is generally most efficient when operating within the speed and torque ranges of the sweet spot 14. If the operating conditions can be controlled so that the motor operates a greater proportion of time at or near its sweet spot 14, the overall energy conversion efficiency of the motor can be significantly improved.

From a practical point of view, however, many driving situations dictate that the motor operates outside of the speed and torque ranges of the sweet spot 14. In electric vehicles it is common to have no transmission and as such have a fixed ratio of the electric motor rotation rate to the wheel rotation rate. In this case, the motor speed may vary between zero, when the vehicle is stopped, to a relatively high RPM when cruising at highway speeds. The torque requirements may also vary widely based on factors such as whether the vehicle is accelerating or decelerating, going uphill, going downhill, traveling on a level surface, braking, etc.

As can be seen in FIG. 1, at any particular motor speed, there will be a corresponding most efficient output torque which is diagrammatically illustrated by maximum efficiency curve 16. From a conceptual standpoint, when the desired motor torque is below the most efficient output torque for the current motor speed, the overall efficiency of the motor can be improved by pulsing the motor, so as to operate the motor a proportion of time at or near its sweet spot and the remainder of the time at a low or zero torque output level. The average torque thus generated is controlled by controlling the duty cycle of sweet spot operation.

Figure 2:
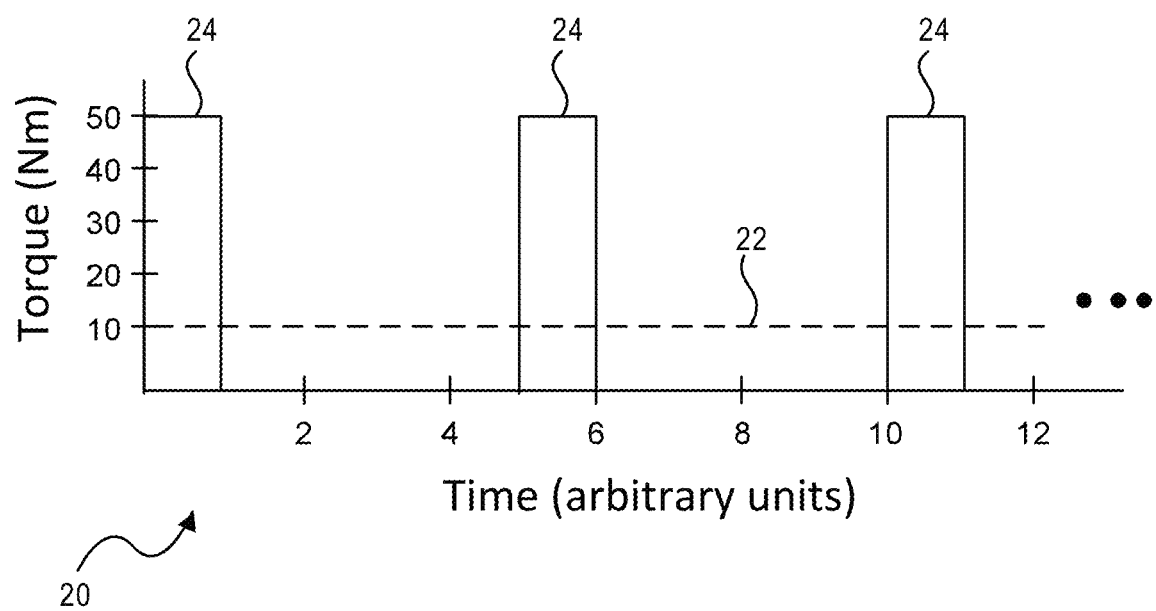
FIG. 2 is a graph illustrating a pulsed torque signal applied to an electric motor.

Referring to FIG. 2, a graph 20 plotting torque on the vertical axis versus time on the horizontal axis is illustrated. During conventional operation, the motor would continuously generate 10 N*m, indicated by dashed line 22, so long as the desired torque remained at this value. With pulsed-control operation, the motor is pulsed with a current pulse signal, as represented by pulses 24, to deliver 50 N*m of torque for 20% of the time. The remaining 80% of the time, the motor is off. The net output of the motor, therefore, meets the operational demand of an average torque level of 10 N*m. Since the motor operates more efficiently when it is delivering 50 N*m than when it delivers a continuous torque of 10 N*m, the motor's overall efficiency can thus be improved by pulsing the motor using a 20% duty cycle while still meeting the average torque demand. Thus, the pulsed operation provides a higher energy efficiency than the continuous operation.

In the above example, the duty cycle is not necessarily limited to 20%. As long as the desired motor output does not exceed 50 N*m, the desired motor output can be met by changing the duty cycle. For instance, if the desired motor output changes to 20 N*m, the duty cycle of the motor operating at 50 N*m can be increased to 40%; if the desired motor output changes to 40 N*m, the duty cycle can be increased to 80%; if the desired motor output changes to 5 N*m, the duty cycle can be reduced to 10% and so on. Generally, pulsed motor control can potentially be used advantageously any time that the desired motor torque falls below the maximum efficiency curve 16 of FIG. 1.

On the other hand, when the desired motor torque is at or above the maximum efficiency curve 16, the motor may be operated in a conventional (continuous or non-pulsed) manner to deliver the desired torque. Pulsed operation offers an opportunity for efficiency gains when the motor is required to deliver an average torque below the torque corresponding to its maximum operating efficiency point.

It should be noted that torque values and time scale provided in FIG. 2 are merely illustrative and are not intended to be limiting in any manner. In actual motor pulsing embodiments, the pulse duration used may widely vary based on the design needs of any particular system. In general, however, the scale of the periods for each on/off cycle is expected to be on the order of 10 milliseconds (ms) to 0.10 seconds (i.e., pulsing at a frequency in the range of 10 to 100 Hz). Furthermore, there are a wide variety of different wound field synchronous motors, and each wound field synchronous motor has its own unique efficiency characteristics. Further, at different motor speeds, a given motor will have a different efficiency curve. The nature of the curve may vary depending on the particular wound field synchronous motor or a particular application. For example, torque output need not be flat topped as depicted in FIG. 2, and/or the torque need not go to zero during the off periods but may be some non-zero value. Regardless of the particular curve used, however, at some proportion of the time the wound field synchronous motor is operating preferably at or near its highest efficiency region for a given wound field synchronous motor speed.

Efficiency Improvements with Improved Faster Current Rise and Fall

The vast majority of current motor converters are typically designed for continuous, not pulsed operation. Such motors generally transition from the unenergized to an energized state relatively infrequently. As a result, little design effort is made in managing such transitions. To the extent any design effort is made in managing the transition, it is typically directed to achieving a smooth transition as opposed to a fast transition. The transition from the energized to energized states for most motors is therefore often rate limited (i.e., relatively not fast).

Figure 3A:
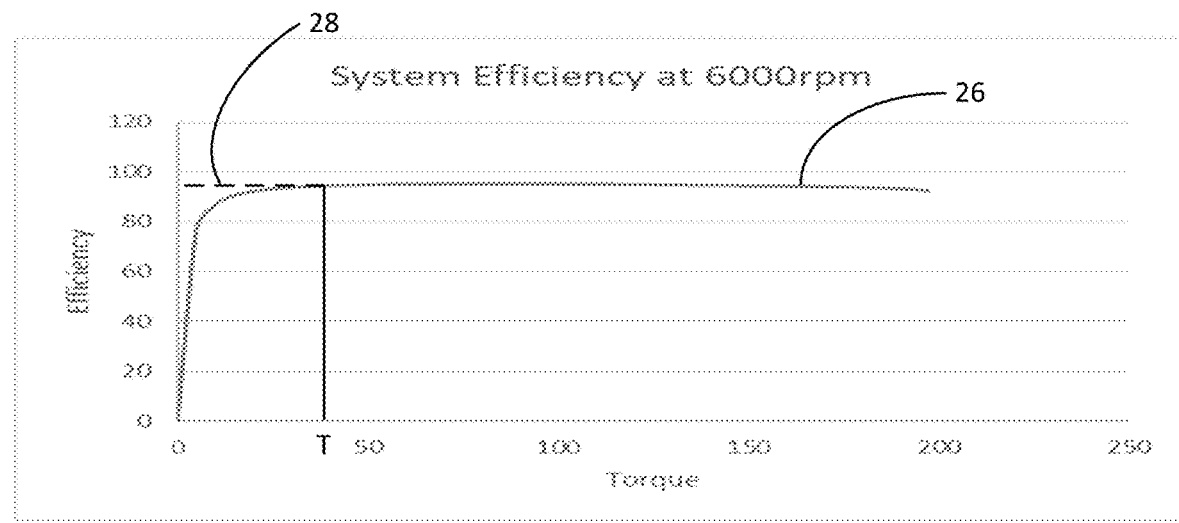
FIG. 3A is a torque versus efficiency map for a motor operating at a fixed speed during a transition from zero to peak efficiency torque.
Figure 3B:
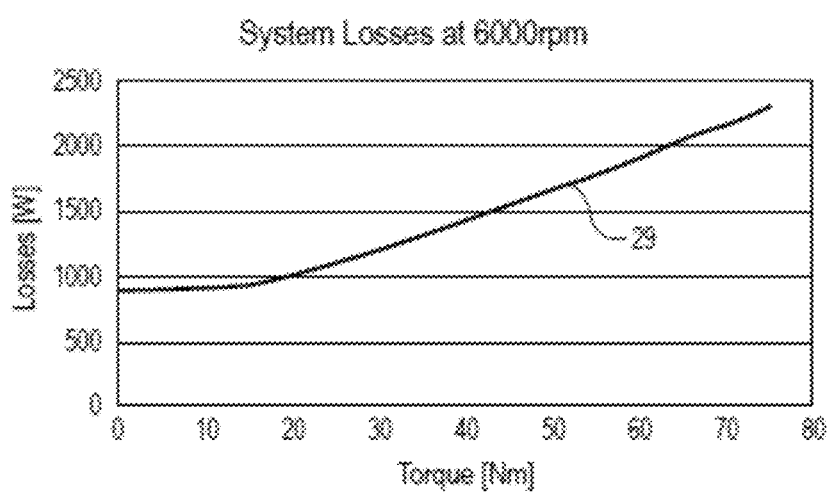
FIG. 3B is a torque versus work lost for an exemplary motor operating at a fixed speed during a transition from zero to peak efficiency torque.

It has been discovered that for an electric motor system that regularly transitions from an unenergized motor state to a peak efficiency state such as with pulsed operation, even further efficiency improvements can be realized when the transitions occur as fast as possible. With fast transitions, for example, from zero torque to the peak efficiency torque, the overall average motor efficiency is improved because the motor spends less time in transition where efficiency is less than the peak. This relationship is depicted in FIG. 3A and FIG. 3B Referring to FIG. 3A, a torque versus efficiency map for an exemplary electric motor operating at a fixed speed (e.g., 6000 rpms) is illustrated. In the exemplary map, a range of torque outputs from 0.0 Nm to 250 Nm is plotted along the horizontal axis, while the efficiency of the motor from 0.0 percent to 100 percent is plotted along the vertical axis. The curve 26 depicts the transition of the motor from zero to peak efficiency torque. During this transition, which in this example is the transition of a torque of zero to a torque T, the torque is being produced at an efficiency that is below that of the peak efficiency torque at T, shown by 28.

Referring to FIG. 3B, a map is provided illustrating torque versus work lost for an exemplary motor operating at a fixed speed during a transition from zero to peak efficiency torque. In this map, the work losses (W) are plotted along the vertical axis, while the torque output of the motor is plotted along the horizontal axis. As demonstrated by the curve 29, the work losses of the motor increase as the torque output increases during the transition from zero to peak efficiency torque. Therefore, the faster the transition time from zero to peak efficiency torque, the less work is performed, and the less energy is consumed by the electric motor.

By substituting time in place of torque along the horizontal axis and then integrating the area under the curve 29, the energy consumed by the electric motor can be calculated for a given transition time. For instance, with an exemplary motor, 7234.5 Joules of energy were used with a transition time of 0.5 seconds, while only 723.4 Joules of energy were used with a transition time of 0.05 seconds. This comparison demonstrates that the faster the transition time from zero to peak efficiency torque, the lower the energy consumed in losses. It should be noted that with this example, it is assumed that no acceleration of the load has taken place, so no energy has been added to the load inertia. Just as efficiency is increased by decreasing rise time, efficiency is increased by decreasing fall time.

For different motors, the transition of the motor from zero to peak efficiency torque, the peak efficiency torque and the work losses will all vary. The maps of FIG. 3A and FIG. 3B should therefore be viewed as merely exemplary and should not be construed as limiting in any regard.

Power Converter

Power inverters are known devices that are used with electric motors for converting a DC power supply, such as that produced by a battery or capacitor, into three-phase AC input power applied to motor stator windings. In response, the stator windings generate a rotating magnetic field.

Figure 4:
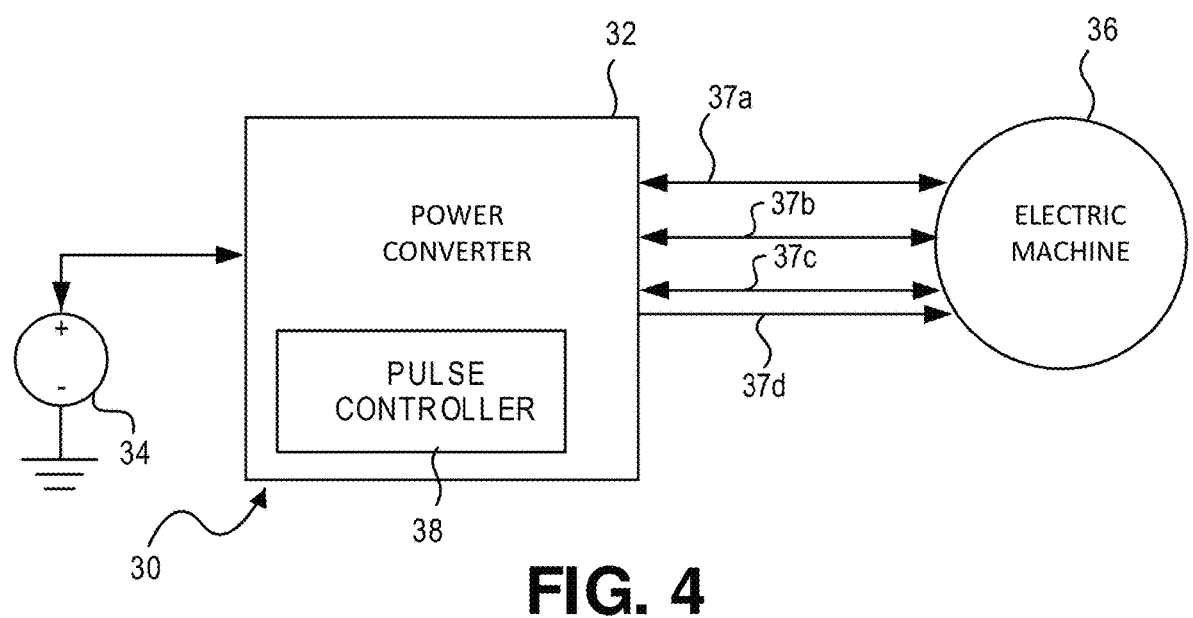
FIG. 4 illustrates a pulsed controlled electric machine in accordance with a non-exclusive embodiment.

Referring to FIG. 4, a diagram of a power controller 30 for pulsed operation of an electric machine is illustrated. The power controller 30 includes a power converter 32, a DC power supply 34, and an electric machine 36, which in some embodiments is a wound field synchronous machine. In this non-exclusive embodiment, the power converter 32 comprises a pulse controller 38. The power converter 32 may be operated as a power inverter or power rectifier depending on the direction of energy flow through the system. When the electric machine is operated as a motor, the power converter 32 is responsible for generating three-phased AC power from the DC power supply 34 to drive the electric machine 36. The three-phased input power, denoted as phase A 37a, phase B 37b, and phase C 37c, is applied to the windings of the stator of the electric machine 36 for generating the RMF as described above. The lines depicting the various phases, 37a, 37b, and 37c are depicted with arrows on both ends indicating that current can flow both from the power converter 32 to the electric machine 36 when the machine is used as a motor and that current can flow from the electric machine 36 to the power converter 32 when the machine is used as a generator. When the electric machine is operating as a generator, the power converter 32 operates as a power rectifier, and the AC power coming from the electric machine 36 is converted to DC power being stored in the DC power supply. The line depicting the field current, 37d carries a DC field current that typically is unidirectional for both the motor and generator operating modes.

The pulse controller 38 is responsible for selectively pulsing the three-phased input power. During conventional (i.e., continuous) operation, the three-phased and field coil input power is continuous or not pulsed. On the other hand, during pulsed operation, the three-phased and field coil input power is pulsed. Pulsed operation may be implemented, in non-exclusive embodiments, using any of the approaches described herein, such as but not limited to the approaches described below.

Referring to FIG. 5A-5F, plots are provided for illustrating the difference between continuous and pulsed three-phased and field current input power provided to the electric machine 36. In each plot, phase and field currents are plotted on the vertical axis, and time is plotted along the horizontal axis.

Figure 5A:
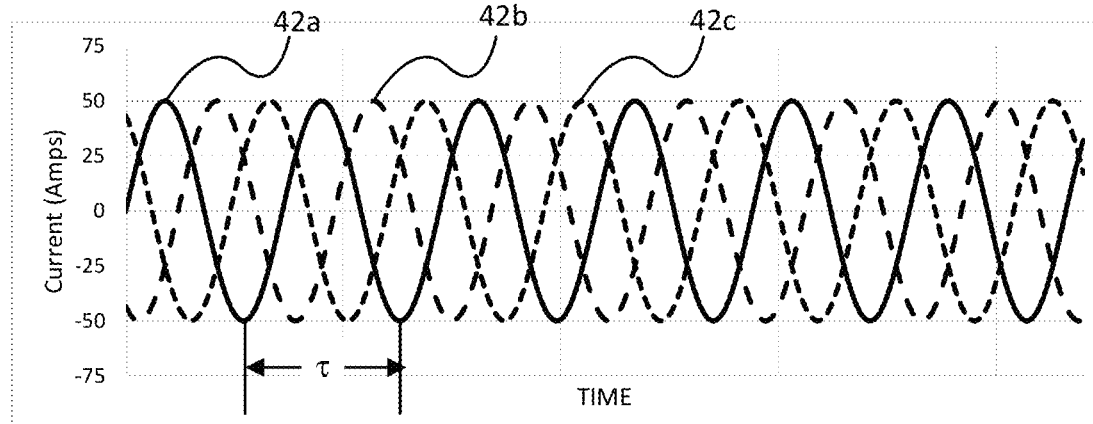
FIG. 5A is a diagrammatic representation of a continuous three-phase AC waveform having a peak value of 50 Amperes for armature windings.
Figure 5B:
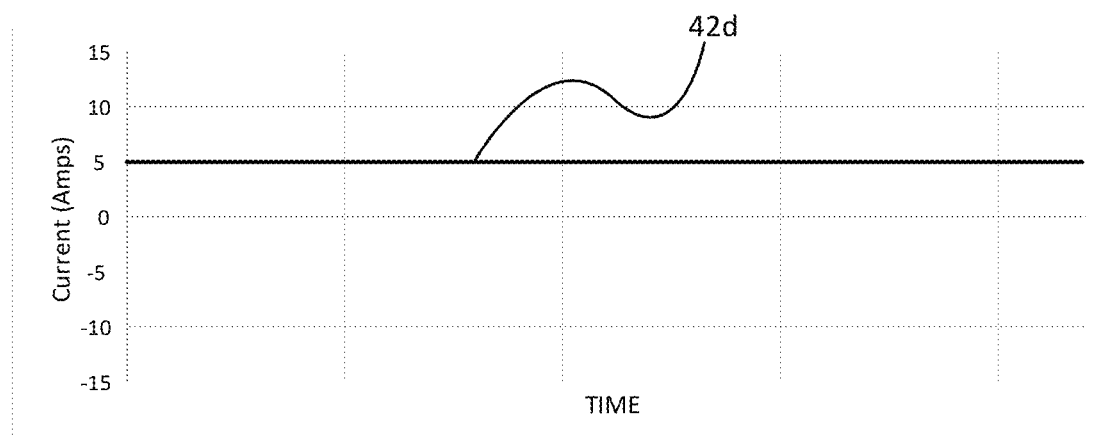
FIG. 5B is a diagrammatic representation of a continuous DC signal at 5 Amperes for field windings.

FIG. 5A illustrates conventional sinusoidal three-phased input current 42a, 42b, and 42c delivered to the armature windings of the electric machine 36. Phase B, denoted by curve 42b lags phase A, denoted by 42a by 120 degrees. Phase C, denoted by curve 42c, lags phase B by 120 degrees. The sine wave period is $\square$. The three-phased input current 42a, 42b, and 42c is continuous (not pulsed) and has a designated maximum amplitude of approximately 50 amps. FIG. 5B illustrates the conventional DC field current 42d delivered to the field coils. The field current is continuous (not pulsed) and has an amplitude of 5 amps. It should be appreciated that 50 amps (for the phased current delivered to the armature windings) and 5 amps (for the field current delivered to the field coils) are only a representative maximum current, and the maximum current may have any value.

Figure 5C:
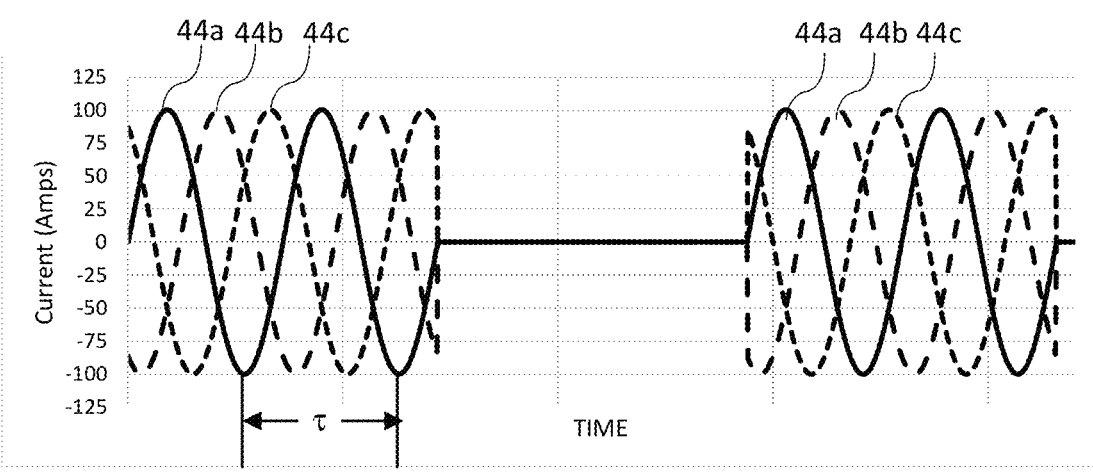
FIGS. 5C and 5E are pulsed waveforms having a 50% duty cycle that provide the same power output as the continuous waveform of FIG. 5A.
Figure 5D:
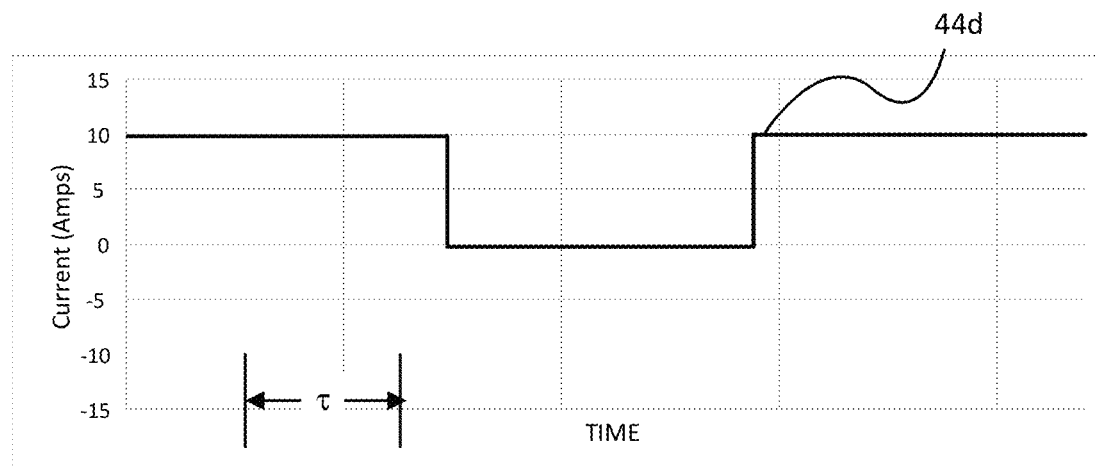
FIGS. 5D and 5F are pulsed DC signals having a 50% duty cycle that provide the same power output as the continuous DC signal of FIG. 5B.

FIG. 5C and FIG. 5D illustrate an example pulsed three-phased current waveforms 44a, 44b, and 44c, shown in FIG. 5C, with a pulsed DC field current 44d, shown in FIG. 5D that has a 50% duty cycle and peak amplitude of approximately 100 amps for the three-phased waveforms 44a, 44b, and 44c and approximately 10 amps for the field current 44d. As in FIG. 5A the period of the base sine wave is $\square$, however, now the sine wave is modulated on and off. The delivered currents in FIG. 5C and FIG. 5D deliver the same average torque as the continuously applied three-phased input current of FIG. 5A and FIG. 5B (assuming torque is proportional to currents, which is often the case). In FIG. 5C and FIG. 5D, the current pulses 44a-d are interleaved with "off" periods of equal length. The length of each on and off period is 2$\square$. In this example, the duty cycle is 50%. The frequency of the pulsed modulation may vary based on the type of electrical machine used, noise and vibration considerations, current operating rotor speed, and other factors.

This example in FIG. 5C and FIG. 5D illustrates an application in which the "on" motor drive pulses are evenly spaced while the motor is operated at a steady state desired output level. Such an approach works well in many circumstances but is not a requirement. The duty cycle need not be 50% but can be adjusted to match the desired average output torque. In FIG. 5C and FIG. 5D the phase of the on/off pulses is synchronized with the applied power; however, the phase of the on/off pulses need not be synchronized with the phase of the applied power in some embodiments. Thus, the relative sizes and/or timing of the motor drive pulses can be varied as long as they average out to deliver the desired average torque.

This example shows how both the armature winding AC current and the DC field coil current may be pulsed. The pulsing is designed to allow the wound field synchronous machine to operate at an efficient torque level while reducing the amount of power needed to provide a desired torque level.

Figure 5E:
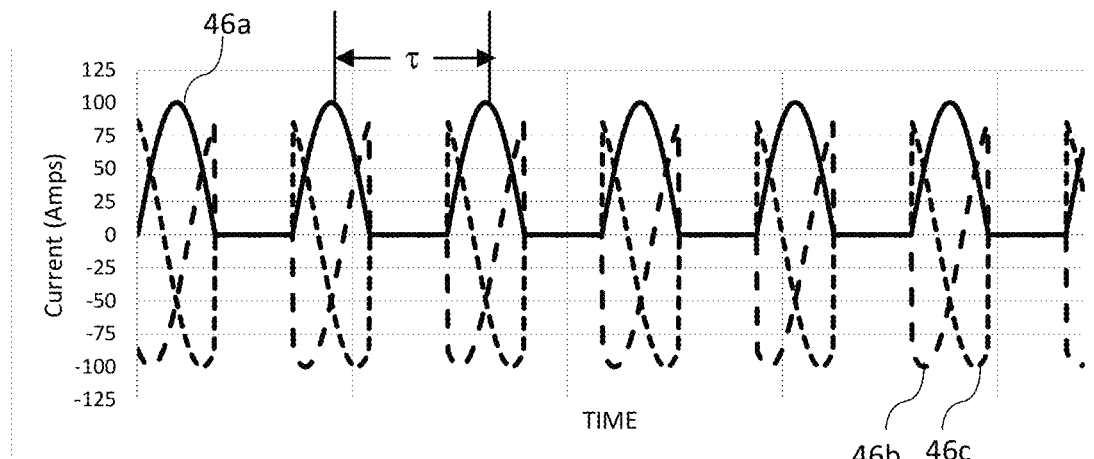
Figure 5F:
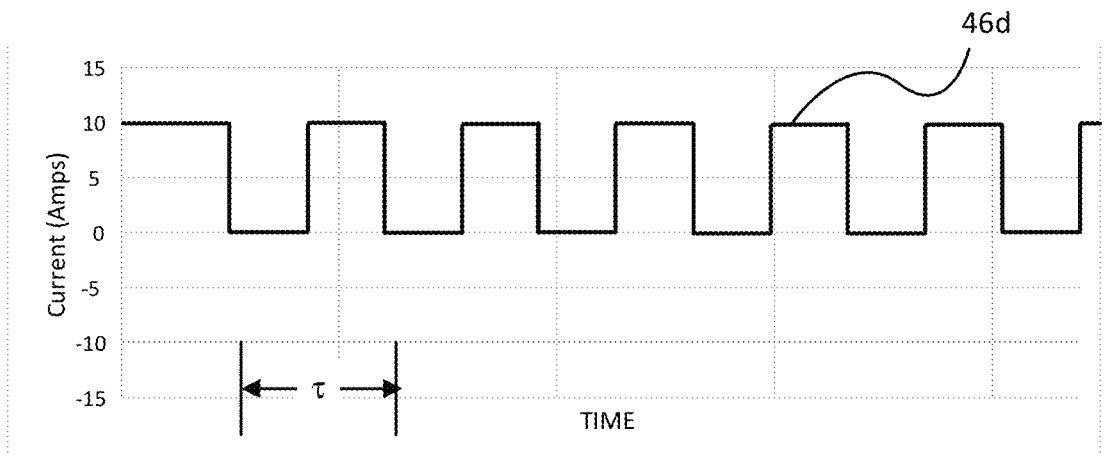

FIG. 5E and FIG. 5F illustrate another example of pulsed three-phased current waveforms 46a, 46b, and 46c, shown in FIG. 5E, with a pulsed DC field current 46d, shown in FIG. 5F that has a 50% duty cycle and peak amplitude of approximately 100 amps for the three-phased waveforms 46a, 46b, and 46c and approximately 10 amps for the field current 46d. As in FIG. 5A the period of the base sine wave is $\square$, however, now the sine wave is modulated on and off. The delivered current in FIG. 5E and FIG. 5F delivers the same average torque as the continuously applied three-phased input current of FIG. 5A and FIG. 5B (assuming torque is proportional to currents, which is often the case). In FIG. 5E and FIG. 5F, the current pulses 46a-d are interleaved with "off" periods of equal length. The length of each on and off period is $\square$/2. In this example, the duty cycle is 50%. The frequency of the pulsed modulation may vary based on the type of electrical machine used, noise and vibration considerations, current operating rotor speed, and other factors.

Power Converter Circuit

The inherent inductance of the motor can transitorily delay/slow the voltage/power steps between the on and off motor states. During continuous (non-pulsed) operation, these transitory effects tend to have a relatively minimal impact on overall motor operation. However, when rapid pulsing is used as contemplated herein, the transitory effects can have a larger net impact, and therefore, there is an incentive to reduce the leading and falling edge pulse transition times. This is particularly important for the field current that exhibits a significantly higher time constant than the armature phased current.

Figure 6A:
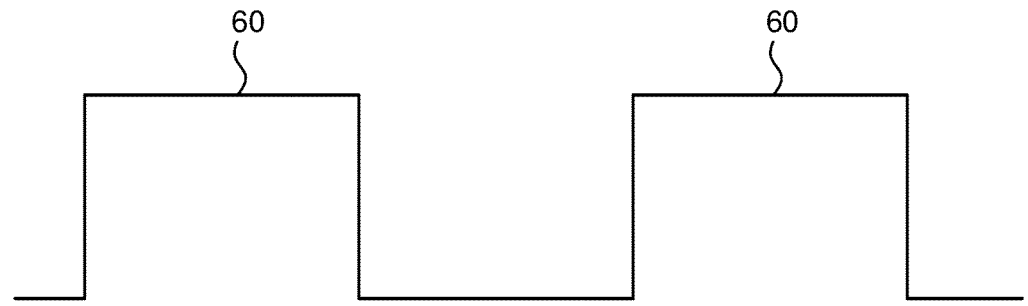
FIGS. 6A-6C are signal diagrams illustrating the benefits of a non-exclusive embodiment.

As previously noted, the goal of pulsed motor control is to operate the electric machine 36 at substantially its most efficient level for the current machine speed during "on" periods and to cut-off power (provide zero or negligible power) during the "off" periods. For example, the power supplied during the off periods may be less than 10%, 5%, 1%, 0.5%, or 0.1% of the power supplied during the "on" period. The operating point while operating during the "on" period may have an efficiency within 5%, 2%, or 1% of a maximum operating efficiency point of the motor at the current motor speed. The transitions thru the low efficiency operating region between the "off" and "on" periods should be as fast as possible to maximize efficiency. Thus, the power transitions between the machine power "on" and "off" states ideally have a leading edge that transitions vertically straight up and a following edge that vertically transitions straight down. Such "perfect" pulses 60 are diagrammatically illustrated in FIG. 6A, which illustrates the ideal motor drive current versus time for pulsed control having a duty cycle of 50%. In this figure, the current pulse 10 represents the field winding current. While the current pulse is shown as flat topped, this will not necessarily be the case.

In the real world, a number of practical limitations make generation of such perfect pulses difficult to achieve. For instance, inductive aspects of both the electric machine 36 and the power converter 32 circuitry slow down the current rise and fall times. The actual response of a particular machine will vary with the electrical characteristics of the electric machine 36, the rotational speed of the electric machine, and the available bus voltages. In general, the actual rise and fall of pulses occur more gradually, meaning the transitions occur over time. The nature of the rise and fall in the real world is diagrammatically illustrated in FIG. 6B. As seen therein, there is a ramp-up period (rise time) 62 required for the current to actually rise from zero to the desired "on" power level and a ramp-down period (fall time) 64 required for the current to actually fall from the "on" power level down to zero.

During the power ramp-up and ramp-down periods, the wound field synchronous machine 36 continues to consume or generate power. However, the wound field synchronous machine operates less efficiently during these transition periods. In general, the wound field synchronous machine efficiency will drop as the operating current drops from its maximum efficiency condition (curve 16 FIG. 1) towards zero, with the energy conversion efficiency getting noticeably worse as the current level approaches zero. Thus, the pulse distortion represented by the current ramp-up and ramp-down periods detracts from efficiency gains resulting from pulsed operation. In general, the smaller the ratio of the rise/fall times to the pulse length, the less the transitory switching effects impact the machine's energy conversion efficiency during pulsing.

Figure 6B:
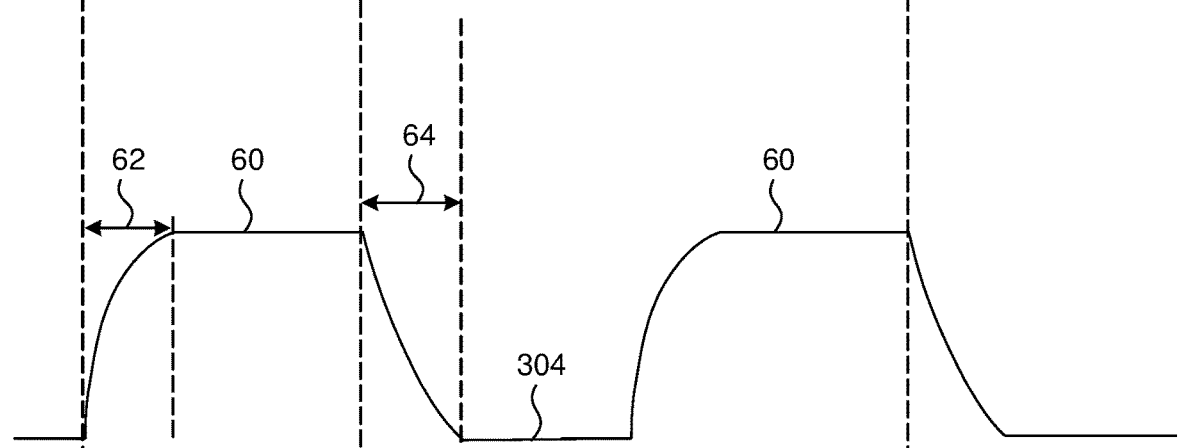

It should be appreciated that the transitory effects shown in FIG. 6B are illustrative in nature and do not necessarily reflect actual rise/fall times associated with the operation of any particular wound field synchronous machine. The relative scale of the rise time to the pulse length ratio can vary widely based on the characteristics of the wound field synchronous machine used (which primarily dictates the rise and fall times), the frequency of the pulsing (which is primarily dictated by the control scheme used) and the pulse width (which is dictated by the control scheme and machine load). The voltage available to power the wound field synchronous electric machine and machine rotation speed will also impact the pulse rise and fall times. If the pulsing is slow compared to the wound field synchronous machine response, the rise/fall times may be a small fraction of the pulse width and the transitory switching effects may have a minimal impact on machine performance. Conversely, if the pulsing is very rapid and/or the wound field synchronous machine response is low, the rise/fall times may be a significant fraction of the pulse width and can even exceed the pulse width in some situations. If not managed carefully, the transitory efficiency losses associated with switching can significantly reduce or even eliminate any theoretical gains that can be attained by pulsed operation. Thus, it is important to consider the transitory switching effects associated with the pulsed operation when determining the pulsing frequency and control schemes that are appropriate for any particular application.

For wound field synchronous machines, the rise times and fall times for the field current are governed by the equation:

$$\frac{dAT_f}{dt} + \frac{AT_f}{\tau_f} = \frac{1}{L_o} * \frac{U_f}{N_f} \quad \text{Eq. (1)}$$

$$\text{where } \tau_f = \frac{L_o}{\left(\frac{\rho * l}{\alpha * s_o}\right)}$$

is the field winding electric time constant,
$N_f$ is the number of Field Winding Turns;
$S_f$ is the Field Winding section;
$R_f$ is the Field winding resistance ($\rho$ is the material resistivity, and l is the Winding length);
$L_f$ is the Field winding Inductance (proportional to the square of the number of turns and the rotor Permeance $L_o$). $L_o$ is linked to the field geometry $$\left(L_o = \mu o * \frac{Spole}{Airgap}, \text{Spole = field pole section, and Airgap Length}\right)$$

$I_f$ is the Field Current;
$U_f$ is the Field winding Supply Voltage;
$AT_f$ is the Field winding Ampere Turns. $AT_f = N_f * I_f$
By plugging in the field winding electric time constant into equation 1 the following solution is found.

$$AT_f(t) = \frac{\tau_f}{L_o} * \frac{U_f}{N_f} * \left(1 - e^{-\frac{t}{\tau_f}}\right) \quad \text{Eq. (2)}$$

From this equation, by decreasing the number of ampere-turns $AT_f$ of magnetic windings and/or increasing the voltage $U_f$, and/or increasing the cross-section of the winding wire $S_f$, the rise time is decreased by increasing $$\frac{dAT_f}{dt}.$$

Various embodiments provide a pulsed control wound field synchronous machine with rise times and fall times of less than 5 ms. However, using a conventional power system with a conventional wound field synchronous motor, a build or decay of no more than 5 ms is not obtained. In various embodiments, the pulsed control provides pulses with a frequency of at least 10 Hz and a period no more than 100 ms and where the rise time is less than 10% of the period.

In some embodiments, the number of turns is reduced by providing at least two wires in parallel to form each turn. In some embodiments, the parallel wires may be in the form of a ribbon cable. In some embodiments, there are at least 5 wires in parallel. In some embodiments, there are fewer than 3 turns. In some embodiments, there is only one turn and at least ten wires in parallel. In some embodiments, a rotary transformer is used to provide power across an air gap. In some embodiments, the power is transferred through slip rings or another type of wireless transmission. In some embodiments, the wires may have a larger diameter to allow an increased current.

Reduced Winding and Increased Wire Cross-Section Embodiments

Figure 7A:
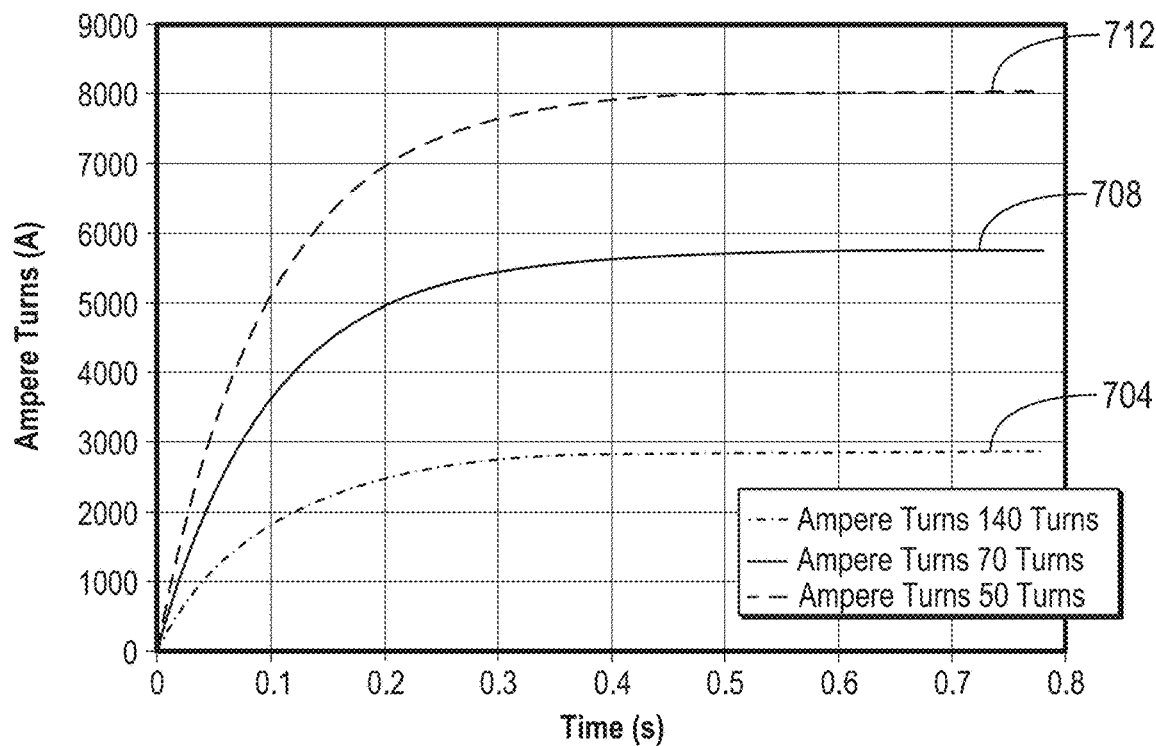
FIGS. 7A and 7B are graphs that illustrate current rise times.
Figure 7B:
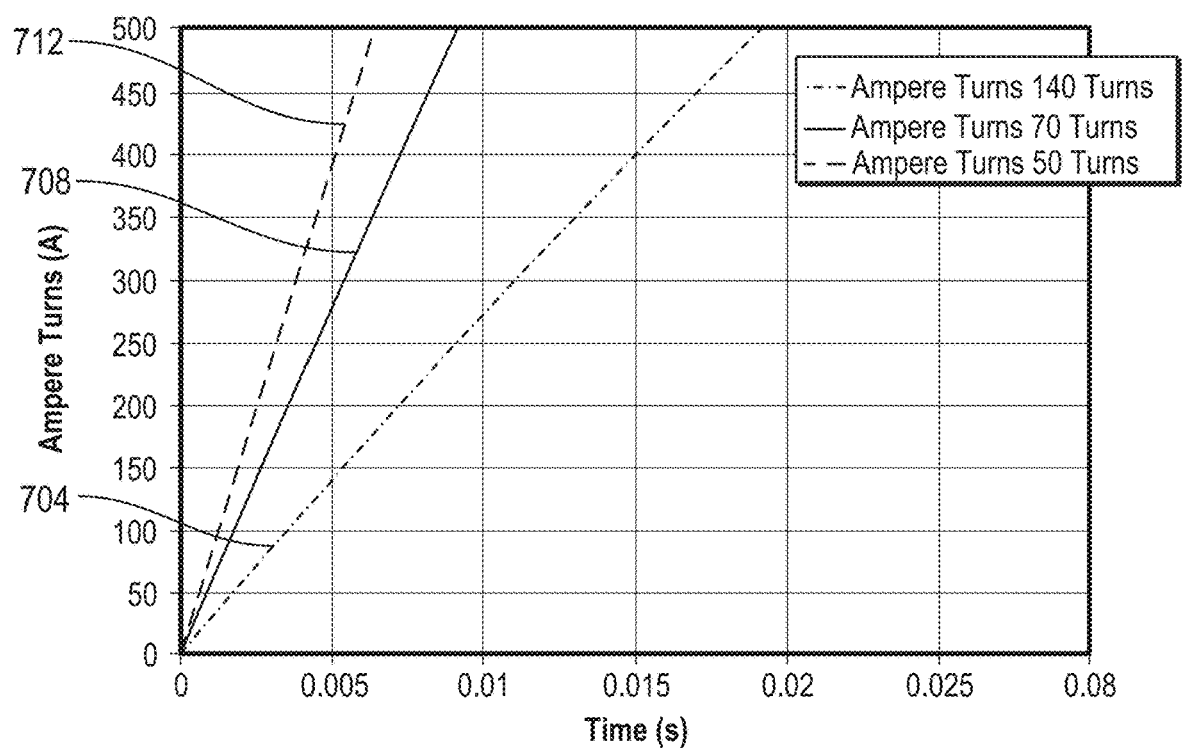

In some embodiments, a decrease in rise time and fall time is provided by reducing the number of turns in each winding. FIG. 7A is a graph that plots ampere turns in amps versus time for 140 turns (704), 70 turns (708), and 50 turns (712). FIG. 7B shows just a portion of the curves for 140 turns (704), 70 turns (708), and 50 turns (712) for 0 to 30 ms. For a machine with 140 turns, it takes approximately 15 ms to reach 400 ampere turns. For a machine with 50 turns, it takes approximately 5 ms to reach 400 ampere turns. It should be noted that by decreasing the turns from 140 turns to 70 turns the time is reduced by 50%. As a result, the rise time and fall time are also reduced by about 50%. It is assumed in this example that the current is regulated by adjusting the applied voltage.

Figure 8A:
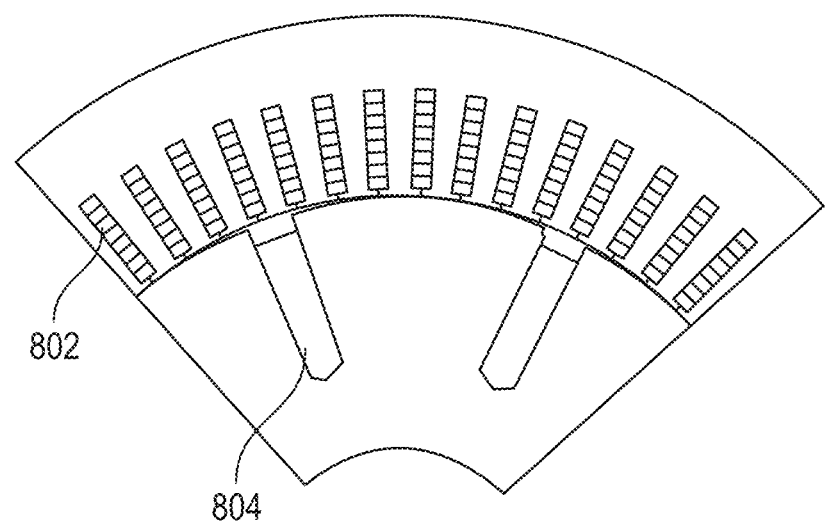
FIGS. 8A and 8B schematic illustrations of part of a single turn wound field synchronous motor of a non-exclusive embodiment.
Figure 8B:
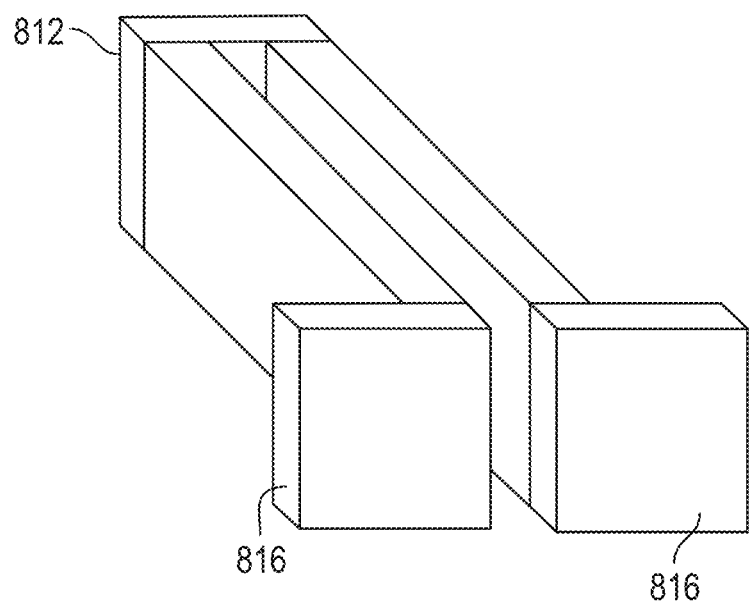

In some embodiments, the windings have no more than 70 turns. In other embodiments, the windings have less than 50 turns. In some embodiments, the windings have only one turn. FIG. 8A is a schematic cross-section of a motor with a single turn. The motor has armature windings 802 in a stator and a field coil or field windings 804 in the rotor. FIG. 8B is a perspective view of part of a single turn. A rear connection 812 that forms the single turn is shown and front connections 816 are shown that connect the single turn to adjacent single turns for adjacent windings. In some embodiments, the field windings 804 of a single turn is a foil formed by a thin sheet of electrically conductive material.

In other embodiments, the rise time and fall time are decreased by increasing the cross-section of the wire of the windings. In one embodiment, thicker wires may be used to increase the cross-section of the wire. However, with high frequency pulsing a skin effect caused by the high frequency pulsing reduces the current in the thick wires. The skin effect causes high frequency pulses to only travel along the skin of the conductor and not through the core of the conductor. Therefore, in other embodiments, a plurality of thin wires in parallel are used instead of a thick wire. In some embodiments, the plurality of thin wires is in the form of a litz wire. In various embodiments, the parallel wires are twisted together or have a random winding to reduce the proximity effect. Increasing the cross-section of the wire may lead to high current levels that might not be acceptable for brushes and slip rings. Various embodiments may have a brushless design. Such a brushless design might use inductive or capacitive coupling to transfer energy across the air gap. Some embodiments may use both a reduced number of turns for the windings and an increased cross-section of the wires.

Increase Voltage

Figure 9:
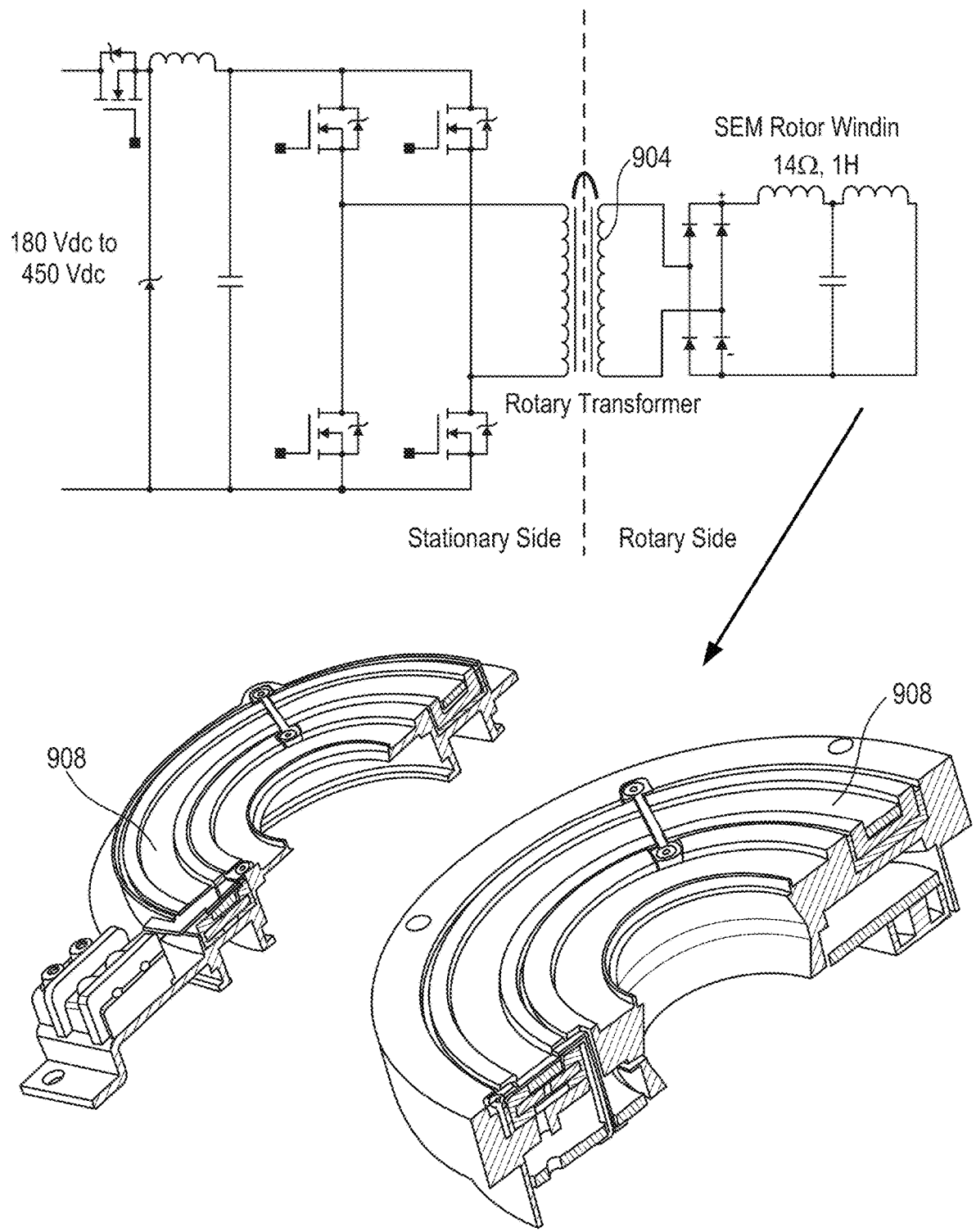
FIG. 9 is a schematic view of a rotary transformer used in a non-exclusive embodiment.

Other embodiments may decrease rise times and/or fall times by increasing the voltage applied to the field winding. FIG. 9 is a schematic illustration of a rotary transformer for providing voltage to the field winding. By increasing the number of turns on the field winding side 904 of the transformer, the voltage is increased (stepped up) resulting in a decrease in rise time. In various embodiments, the voltage is stepped up from the voltage source to the voltage applied to the rotor windings 908 in order to decrease rise times. Many conventional wound field synchronous motors step down the voltage applied from a voltage source to the voltage applied to the rotor windings. In some embodiments, the transformer may be an air core transformer. Air core transformers are more efficient at higher frequencies. In this example, the rise time is decreased, but the fall time is not changed. A more complex design may be used to decrease both the rise time and the fall time.

Figure 10:
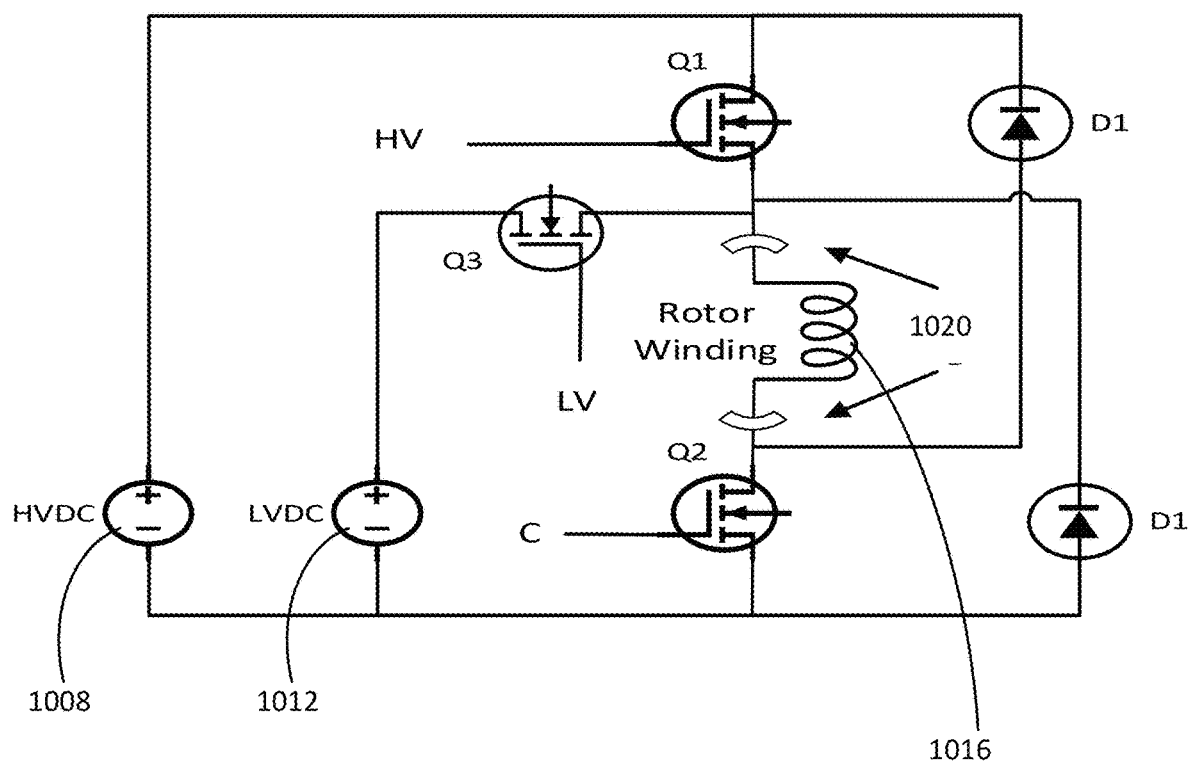
FIG. 10 is a schematic view of a power source used in a non-exclusive embodiment.

In other embodiments, the voltage is increased by providing two voltage sources in order to decrease both rise times and fall times. FIG. 10 is a schematic view of a power source that comprises two voltage sources. In this embodiment, the power source comprises a high voltage source 1008 and a low voltage source 1012. In one method that may use the power source, a high voltage from the high voltage source 1008 is applied when a fast rise time is needed to reach a desired current. This may be done by turning Q2 and Q1 on at the same time. When a desired current is reached after the fast rise time, the high voltage is stopped and a voltage from the low voltage source 1012 is applied to maintain the desired current or when the fast rise time is not needed. This may be done by turning off Q1 and turning on Q3. To achieve a fast current fall time the rotor winding is open circuited. This may be done by turning off Q3 and Q2. Diodes D1 and D2 will catch the flyback voltage returning the field energy to the high voltage link. The returning current will naturally decay to zero hence turning off both D1 and D2. Any negative torque transient caused by the reversal of current in the field winding should be short lived as the stator current will return to zero rapidly due to the low time constant of the stator. In addition, captured field energy will be returned to the motor on the next application of the pulsed current. Electrical contacts 1020 are used to provide an electrical contact between the power source and the field windings 1016. In some embodiments, the electrical contacts 1020 are slip rings or a type of contactless transmission, such as rotating transformers or capacitive coupling to bridge the air gap. Where logic signals are needed to reconstitute the DC applied to the rotor winding they may be transferred across the air gap by either optical coupling or transformer based coupling. By decreasing both the rise time and fall time of the field windings, efficiency is further increased. In some embodiments, the low voltage would be on the order of 12 volts and the high voltage would be on the order of 300 volts. Currently, electric vehicles have systems that provide such voltages. In various embodiments, use of a higher voltage may also be combined with either reducing the number of windings and/or increasing the wiring cross-section to provide faster rise times and fast fall times.

Figure 6C:
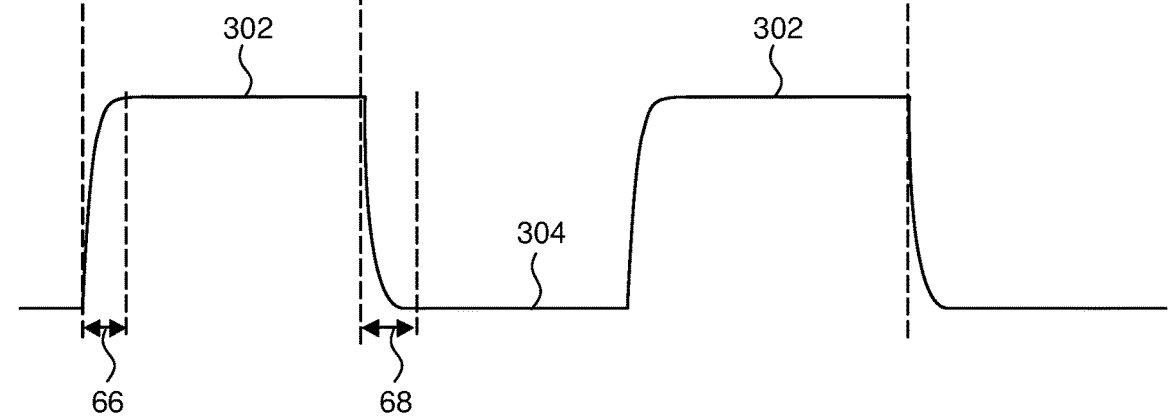

Examples of improved rise and fall times are schematically shown in FIG. 6C. As evident in the figure, the ramp-up rise time 66 on the pulse leading edge is faster/shorter as compared to the corresponding ramp-up time 62 shown in FIG. 6B. Similarly, the ramp-down time 68 of the pulse trailing edge is faster/shorter as compared to the corresponding ramp-down time 64 shown in FIG. 6B. Therefore, it should be appreciated that electric machines designed with pulsed control in mind or modified to improve the transient response of the machine to power pulses, can benefit even more from pulsed operation than existing machines.

Various may provide a fast rise time or a fast fall time. Some embodiments have a fast rise time and a fast fall time. In some embodiments, the fast rise time is the same length as the fast fall time. In some embodiments, the fast rise time is symmetric with the fast fall time. In some embodiments, the fast rise time and/or fall time of the field windings are the same length and/or symmetric to the fast rise time and/or fall time of the armature windings.

Operational Flow Diagrams

Figure 11:
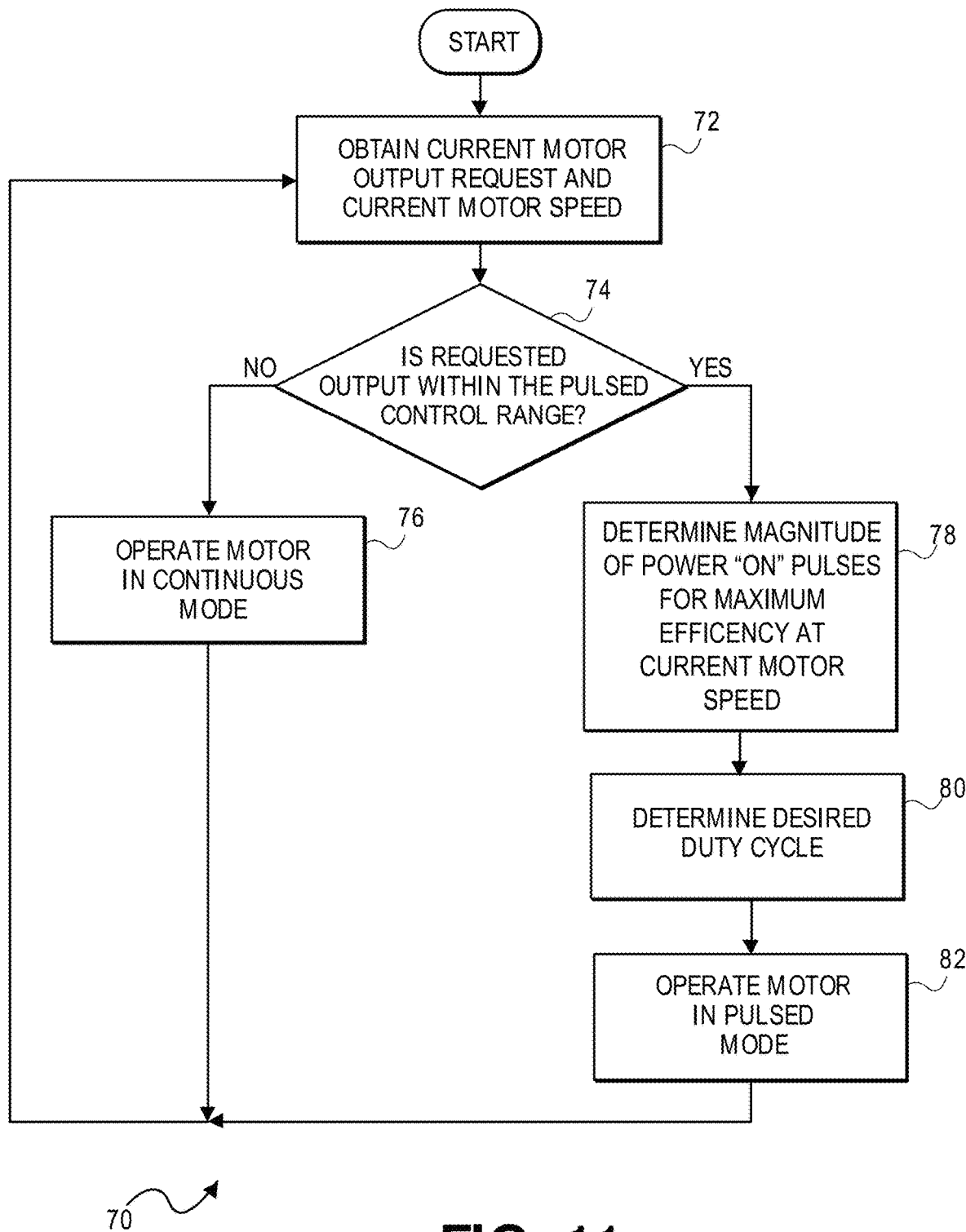
FIG. 11 is a flow diagram illustrating steps for pulsed control operation of an electric machine in a vehicle in accordance with a non-exclusive embodiment.

FIG. 11 is a flow diagram 70 illustrating steps for pulsed control operation of an electric motor with characteristics such as those depicted in FIG. 1. In the initial step 72, the current motor output and current motor speed are ascertained.

In decision step 74, a determination is made based on the current motor output and current motor speed if the motor should be operated in a continuous mode or a pulsed mode. In other words, a determination is made if the desired motor torque is above or below the most efficient output torque for the current motor speed (i.e., the maximum efficiency curve 16 of the motor map illustrated in FIG. 1). If above, the motor is operated in the continuous mode. If below, the motor may advantageously be operated in the pulsed mode. In step 76, the motor is operated in the continuous mode 76 if the current motor torque is above the most efficient output torque for the current motor speed.

In step 78, the power output or magnitude of the "on" pulses that provide for substantially maximum efficiency operation at the current motor speed is determined. In step 80, the desired pulse duty cycle for operation in the pulsed mode is determined so that the average output power or torque matches the desired output.

In step 82, the motor is operated in the pulsed mode using the determined pulse duty cycle and pulsed power output. The use of the power controller 30 in various embodiments reduces the rise and fall times of the pulses, further improving motor efficiency.

The above steps 72-82 are continuously performed while the motor is in operation. At any particular motor speed, there will be a corresponding most efficient output torque which is diagrammatically illustrated by maximum efficiency curve 16 in FIG. 1. As the instantaneous motor output request and/or current motor speed change, a decision is made to operate the motor in either the continuous or pulsed mode as appropriate. From a conceptual standpoint, when the desired motor torque is below the most efficient output torque for the current motor speed, the overall efficiency of the motor can be improved by pulsing the motor. As a result, for electric motor-powered vehicles, the overall efficiency of the vehicle is improved, meaning the vehicle range between battery recharging is extended.

While this disclosure has been described in terms of several preferred embodiments, there are alterations, modifications, permutations, and various substitute equivalents, which fall within the scope of this disclosure. It should also be noted that there are many alternative ways of implementing the methods and apparatuses of the present disclosure. It is therefore intended that the following appended claims be interpreted as including all such alterations, modifications, permutations, and various substitute equivalents as fall within the true spirit and scope of the present disclosure.

What is claimed is:

1. An electric machine, comprising:
a power supply;
a wound field synchronous machine with armature windings and field windings; and
a power converter coupled between the power supply and the wound field synchronous machine, the power converter arranged to provide a pulsed operation by providing a pulsed DC current to the field windings, wherein the pulsed DC current is unidirectional.

2. The electric machine, as recited in claim 1, wherein the power converter is adapted for delivering a desired output, wherein the pulsed operation creates a current pulse signal in the field windings that causes the wound field synchronous machine to alternate between at least a first torque level and a second torque level to provide an average torque level, wherein the current pulse signal is selected to provide a higher energy conversion efficiency during the pulsed operation of the electric machine than the electric machine would have when operated at a third torque level that would be required to drive the electric machine with a continuous torque equal to the average torque level.

3. The electric machine, as recited in claim 1, wherein the field windings of the wound field synchronous machine comprises a ribbon cable.

4. The electric machine, as recited in claim 1, wherein the power converter comprises a rotary transformer with a step up voltage.

5. The electric machine as recited in claim 1, wherein the wound field synchronous machine is a wound field synchronous motor.

6. The electric machine, as recited in claim 2, wherein the current pulse signal has a frequency of at least 10 Hz, wherein at least one of a rise time and a fall time for the current pulse signal is no more than 5 ms.

7. The electric machine, as recited in claim 6, wherein both the rise time and fall time are no more than 5 ms.

8. An electric machine, comprising:
a power supply;
a wound field synchronous machine with armature windings and field windings; and
a power converter coupled between the power supply and the wound field synchronous machine, the power converter arranged to provide a pulsed operation by providing a pulsed DC current to the field windings, wherein the field windings of the wound field synchronous machine have less than 50 turns.

9. An electric machine, comprising:
a power supply;
a wound field synchronous machine with armature windings and field windings; and
a power converter coupled between the power supply and the wound field synchronous machine, the power converter arranged to provide a pulsed operation by providing a pulsed DC current to the field windings, wherein the field windings of the wound field synchronous machine have only one turn.

10. An electric machine, comprising:
a power supply;
a wound field synchronous machine with armature windings and field windings; and
a power converter coupled between the power supply and the wound field synchronous machine, the power converter arranged to provide a pulsed operation by providing a pulsed DC current to the field windings, wherein the field windings comprise a foil.

11. An electric machine, comprising:
a power supply;
a wound field synchronous machine with armature windings and field windings; and
a power converter coupled between the power supply and the wound field synchronous machine, the power converter arranged to provide a pulsed operation by providing a pulsed DC current to the field windings, wherein the power converter comprises a first voltage source and a second voltage source, wherein the first voltage source provides a higher voltage than the second voltage source, wherein the power converter provides voltage from the first voltage source to provide a current rise time and wherein voltage from the first voltage source is removed after the current rise time and voltage from the second voltage source is provided to maintain a current and wherein voltage from the first voltage source is provided to provide a current fall time and wherein voltage from the first voltage source is removed after the current fall time is provided.

12. An electric machine, comprising:
a power supply:
a wound field synchronous machine with armature windings and field windings; and
a power converter coupled between the power supply and the wound field synchronous machine, the power converter arranged to provide a pulsed operation by providing a pulsed DC current to the field windings, wherein the power converter is further arranged to determine if a desired torque is at a torque where a current pulse signal is not provided as efficiently as a continuous current and providing a continuous current if it is determined that the current pulse signal is not as efficient as the continuous current.

13. The electric machine as recited in claim 12, wherein the field windings of the wound field synchronous machine have less than 70 turns.

14. A method of operating a wound field synchronous machine with field windings and armature winding, comprising providing a pulsed operation by providing a pulsed DC current to the field windings, wherein the pulsed DC current is unidirectional.

15. The method, as recited in claim 14, wherein the pulsed operation creates a current pulse signal in the field windings that causes the wound field synchronous machine to alternate between at least a first torque level and a second torque level to provide an average torque level, wherein the current pulse signal is selected to provide a higher energy conversion efficiency during the pulsed operation of the wound field synchronous machine than the wound field synchronous machine would have when operated at a third torque level that would be required to drive the wound field synchronous machine with a continuous torque equal to the average torque level.

16. The method as recited in claim 14, wherein the wound field synchronous machine is a wound field synchronous motor.

17. The method, as recited in claim 15, wherein the current pulse signal has a frequency of at least 10 Hz, wherein at least one of a rise time and a fall time for the current pulse signal is no more than 5 ms.

18. The method, as recited in claim 17, wherein both the rise time and fall time are no more than 5 ms.

19. A method, of operating a wound field synchronous machine with field windings and armature winding, comprising providing a pulsed operation by providing a pulsed DC current to the field windings, wherein a power converter is connected to the wound field synchronous machine, wherein the power converter comprises a first voltage source and a second voltage source, wherein the first voltage source provides a higher voltage than the second voltage source, wherein the method further comprises:
providing a voltage from the first voltage source to provide a current rise time;
removing voltage from the first voltage source after the current rise time;
providing voltage from the second voltage source to maintain a current;
providing voltage from the first voltage source to provide a current fall time; and
removing voltage from the first voltage source after the current fall time.

20. A method, of operating a wound field synchronous machine with field windings and armature winding, comprising providing a pulsed operation by providing a pulsed DC current to the field windings, wherein a power converter is connected to the wound field synchronous machine, wherein the method further comprises:
determining by the power converter if a desired torque is at a torque where a current pulse signal is not provided as efficiently as a continuous current; and
providing a continuous current if it is determined that the current pulse signal is not as efficient as the continuous current.

* * * * *